United States Patent [19]

Kunze

[11] Patent Number: 4,590,328
[45] Date of Patent: May 20, 1986

[54] PLASTIC SEALING PLUGS FOR CABLE FITTINGS

[75] Inventor: Dieter Kunze, Neuried, Fed. Rep. of Germany

[73] Assignee: Siemens Aktiengesellschaft, Berlin & Munich, Fed. Rep. of Germany

[21] Appl. No.: 588,150

[22] Filed: Mar. 9, 1984

[30] Foreign Application Priority Data

Mar. 22, 1983 [DE] Fed. Rep. of Germany ....... 3310377

[51] Int. Cl.$^4$ ........................................... H02G 15/04
[52] U.S. Cl. ................... 174/88 R; 174/77 R; 174/116; 174/DIG. 8
[58] Field of Search ................ 174/77 R, 88 R, 92 R, 174/93, 116, DIG. 8; 277/1; 428/373, 374

[56] References Cited

U.S. PATENT DOCUMENTS 3,990,661 11/1976 De Groef ................. 174/DIG. 8 X
4,095,044 6/1978 Horsma et al. .................... 174/92 X
4,350,842 9/1982 Nolf ........................... 174/88 R X
4,438,294 3/1984 Meltsch et al. .......... 174/DIG. 8 X

FOREIGN PATENT DOCUMENTS 2209629 7/1979 Fed. Rep. of Germany ........ 174/92
3127567 1/1983 Fed. Rep. of Germany .... 174/77 R Primary Examiner—A. T. Grimley
Assistant Examiner—Morris H. Nimmo
Attorney, Agent, or Firm—Hill, Van Santen, Steadman & Simpson

[57] ABSTRACT

A filling piece or plug of plastic sealing material for sealing the gore spaces between the cables of a cable fitting consisting of shrinkable material is provided wherein the filling piece is specifically dimensioned relative to the diameter of the cables, has a rectangular cross-section and has a swelling and subsiding longitudinal expanse. The plastic sealing material can be surrounded by a tensile band or ring to support the sealing compound.

6 Claims, 14 Drawing Figures

PLASTIC SEALING PLUGS FOR CABLE FITTINGS

BACKGROUND OF THE INVENTION

1. Field of the Invention

The invention relates to a filling piece or plug of plastic sealing material for sealing the gore spaces between cables in the cable introduction areas of shrinkable material cable fittings.

2. Description of the Prior Art

An arrangement for gas-tight and moisture-tight introduction of electrical cable in heat shrink cable fittings is known from German Pat. No. 22 09 629. These filling pieces are employed for sealing the introduction space between the cable claddings or insulation and the respective sleeve member, and they are usually inserted in corresponding chambers or areas of the sleeve space. These filling pieces are usually manufactured as circular disks of plastic material. A filling plug is also known in the art that can be employed in cable sleeves consisting of shrinkable material, whereby the required sealing is achieved only by means of the shrinkage forces of the cable sleeve during the shrink process. The surfaces of the clearances of this filling plug are provided with a coating of thermally activated adhesive. Under certain conditions, the seal in the inner reaches of these filling plugs could be insufficient when the heat required for the activation of the thermally activated adhesive layer cannot or does not penetrate to the inside of the filling plugs. Due to its coating of thermally activated adhesive, such a filling plug cannot be utilized for any arbitrary cable diameter.

SUMMARY OF THE INVENTION

It is therefore an object of the present invention to produce a plastic filling piece for employment as a plug in shrink fittings which can be employed in a wide range independently of the diameters of the cables to be assembled. This object is achieved with the provision of a filling piece having a nearly rectangular cross-sectional shape perpendicular to the cable introduction orientation, that is, perpendicular to the cable longitudinal axis, wherein the rectangular shape is dimensioned such that the one lateral expanse, as the height of the filling piece, is at least as large as the diameter of the smallest introduced cable but not greater than four times the diameter of the largest cable and wherein the second lateral expanse of the filling piece is greater than half the diameter of the smallest cable introduced but smaller than the diameter of the largest cable introduced. Further, the shape of the filling piece in its longitudinal expanse proceeding in the cable introduction direction is designed swelling and subsiding.

The plug according to the present invention has a number of advantages over the prior art devices, such as, a selection regarding matching of the plug size to various cable diameters need not be carried out within wide ranges of cable diameters and the seaing effect when using cable fittings of shrinkable material can be guaranteed without auxiliary means. The compression of the plastic filling piece is caused by the shrinkage forces occurring during the shrink process. The plug itself does not shrink, but rather is compressed by shrinkage of the cable fitting.

A further advantage is provided by the plug of the present invention in that the internally disposed surfaces of the filling piece that press against the cables no longer have to be coated with thermally activated adhesive. It was precisely in these areas that an assured delivery of heat for the activation of the thermally activated adhesive located there was very critical in that prior devices since the heat conduction within the sealing compound cannot be reliably controlled. Loss of a tight seal could occur in the internal areas under certain conditions due to inadequate activation of the thermally activated adhesive located there. The seal in the outer regions between the cable fitting, the internally adjacent sealing compound and the cable, however, is assured in devices embodying the principles of the present invention since the delivery of heat during the shrink process is completely adequate for the activation of the thermally activated adhesive on the inside of the cable fitting and on the outside of the filling piece.

An indication of adequate heat delivery can be acquired according to a specific embodiment of the present invention by means of a special design of the filling piece, for example by means of a sharp-edged design of an envelope of shrinkable material that surrounds the plastic plug. The sharp-edged design of the envelope first appears through the softened sleeve wall as an angular contour that retracts or even disappears when the sharp-edged envelope situated in the inside of the seaing area has also become soft. When this condition occurs, then the internally disposed region is adequately heated and activated so that the delivery of heat can be discontinued.

The swelling and subsiding design of the filling piece in longitudinal direction further guarantees that there are two cutting planes for every combination of cable diameter having an optimum embrace of the filling piece by the collar of the shrink fittings without the height of the filling piece needing to be reduced by means of compression. The dimensioning of the filling piece allows a wide use range regarding the diameters of the introduced cables.

In addition to the coating of the outwardly directed surfaces of the filling piece, the sealing reliability against pressure loads can be further enhanced when a band or a ring of tensile, flexible material is also applied to the outside surfaces. It is particularly advantageous to employ shrinkable material for this purpose since the band or ring will at least partially shrink during shrinking of the cable fitting and will thus additionally compress the plastic sealing compound of the filling piece and reinforce it after assembly.

DESCRIPTION OF THE PREFERRED EMBODIMENTS

Figure 1:
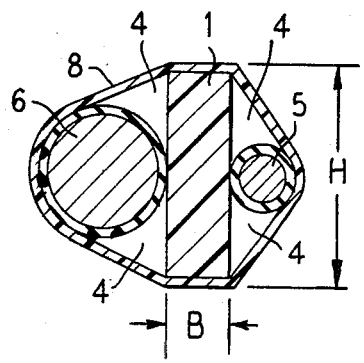
FIG. 1 is a sectional view showing the configuration of the filling piece when used with two cables before the cable fitting sleeve has been heat shrunk.
Figure 1A:
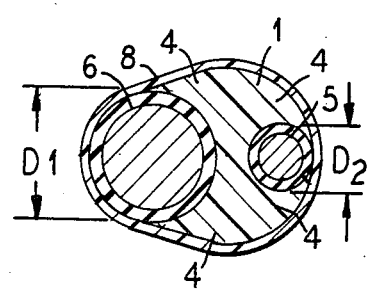
FIG. 1A is a sectional view showing the configuration of the filling piece when used with two cables after the cable fitting sleeve has been heat shrunk.

The arrangement of a cable introduction into a cable fitting of shrinkable material using a filling piece or plug 1 embodying the principles of the present invention is shown in FIGS. 1 and 1A, comprising a sealing compound such as bitumen which is plastically deformable as is known from German OS 3,127,567. The filling piece 1 consists of an approximately retangular block of plastic material which is designed swelling and subsiding in longitudinal direction, i.e. varying in height H along a longitudinal expanse L, seen in FIGS. 4–6. It is seen in FIG. 1A that, for example, two cables 5 and 6 displace the sealing compound or plug 1 into the gore areas 4 between the cables 5 and 6 upon a shrinkage of a heat shrinkable cable fitting sleeve 8. Further, the areas projecting beyond the diameters of the cables of the filling piece 1 are also pressed into the gore areas 4 during the shrinking process by the shrinking cable fitting 8, so that a compression that leads to the sealing of the cable introduction area simultaneously follows due to the displacement of the sealing compound. The dimensioning of such a filling piece 1 that can be utilized in wide ranges of different cable diameters ensues, for instance, according to the following rule:

$$D_2 = H = 4 \cdot D_1$$

and $$0.5 \cdot D_2 = B = D_1$$

A length L of the filling piece is about the same as a height H, whereby H is to be understood as the maximum height.

This means that the height H of the filling piece 1 is to be selected at least as great as a diameter $D_2$ of the smallest introduced cable 5 but should not be greater than four times a diameter $D_1$ of the largest introduced cable 6. The width B of the filling piece 1 should be greater than half the diameter $D_2$ of the smallest introduced cable 5 but smaller than the diameter $D_1$ of the largest introduced cable 6. Optimum sealing conditions in the cable introduction areas of the shrinkable cable fitting 8 derive given such dimensioning. The shaping of the filling piece 1 in longitudinal direction shall be explained in greater detail below.

Figure 2:
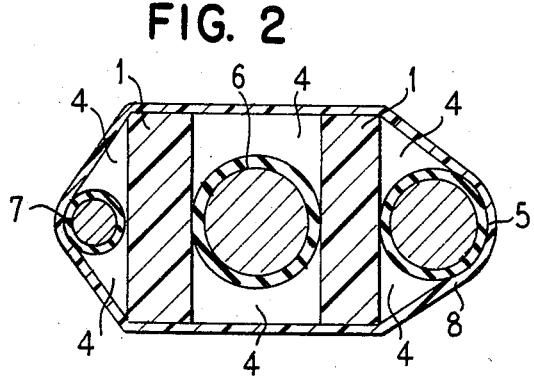
FIG. 2 is a sectional view showing the configuration of the filling piece when used with three cables lying next to one another before the cable fitting sleeve has been heat shrunk.
Figure 2A:
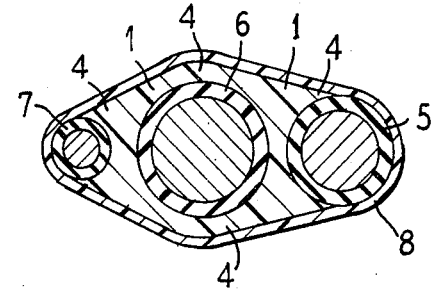
FIG. 2A is a sectional view showing the configuration of the filling piece when used with three cables lying next to one another after the cable fitting sleeve has been heat shrunk.

FIGS. 2 and 2A show a cable introduction area having more than two, for example three cables 5, 6 and 7. It clearly follows that one can also proceed in this case according to the principle already described since the dimensioning of the filling piece 1 required between the cables can be determined from the dimensions of the cables between which it is disposed. Any desired sequences of cable introductions that are based on the inventive principle can be produced in this manner. After the shrink process, the same conditions as above again derive; portions of the filling piece 1 are displaced into the gore regions 4 and are compressed there as a result of the shrinkage of the sleeve 8.

Figure 3:
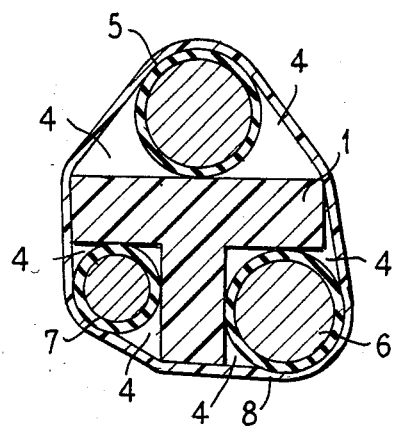
FIG. 3 is a sectional view showing the configuration of a T-shaped filling piece when used with three cables in a triangular relationship before the fitting sleeve has been heat shrunk.
Figure 3A:
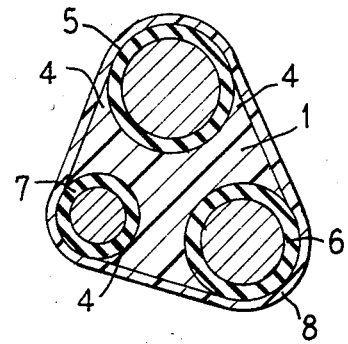
FIG. 3A is a sectional view showing the configuration of a T-shaped filling piece when used with three cables in triangular relationship after the cable fitting sleeve has been heat shrunk.

FIGS. 3 and 3A illustrate an exemplary embodiment having three introduced cables 5, 6 and 7 that, however, are disposed in a triangular configuration. A T-shaped base element is thereby employed as the filling piece 1, whereby two of the introduced cables 6 and 7 are inserted in the corners of the T-shape. The displacement and compression of the sealing compound again occurs in the manner described above due to the shrinkage of the sleeve 8, i.e. the portions are displaced into the regions 4. The filling piece 1 designed T-shaped, however, can also be composed of individual, rectangular plugs as already described in FIGS. 1 and 2 when the one is vertically disposed and the other is horizontally diposed thereabove. The displacement and compression conditions remain the same.

Figure 4:
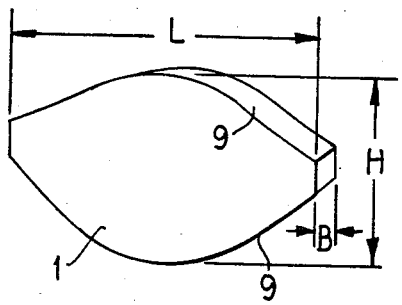
FIG. 4 is a perspective view of an oval filling piece.
Figure 5:
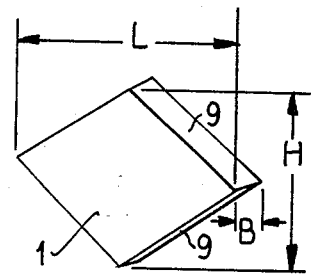
FIG. 5 is a perspective view of a lozenge-shaped filling piece.
Figure 6:
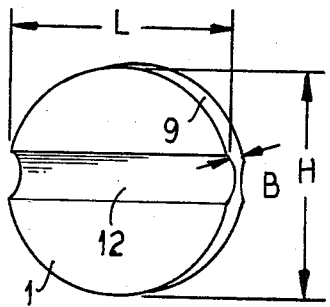
FIG. 6 is a perspective view of a circular filling piece.

Some examples for the shape of the filling pieces 1 in their longitudinal expanse L are shown in FIGS. 4–6, whereby further possibilities of this type are conceivable. The introduced cables are disposed running parallel and pressed into the longitudinal surfaces of the long sides of the fitting piece 1. For the purpose of general orientation, the filling pieces 1 are shown in perspective illustration showing the dimensions of the height H and the width B of the filling piece 1. The surfaces 9 that are outwardly directed after assembly can be expediently coated with a thermally activated adhesive so that particularly good adhesion and sealing to the inside wall of the cable fitting can be guaranteed in these areas.

The filling piece 1 according to FIG. 4 has an approximately oval longitudinal expanse L. That according to FIG. 5 a lozenge-shaped longitudinal expanse L and that according to FIG. 6 has an approximately circular longitudinal expanse L, i.e. the height H of the filling piece 1 as viewed in longitudinal direction first increases and then decreases. The filling piece is thus designed swelling and then subsiding in longitudinal expanse L for each of the embodiments. As already mentioned, this design assures an adequate compression into the gore regions between the introduced cable and the shrunk-on cable fitting in two cutting planes.

Longitudinally proceeding indentations or grooves 12 as seen in FIG. 6, can be advantageously applied in the insertion areas of the cables in the lateral surfaces proceeding in the longitudinal expanse, thus guiding the insertion of the cables and the plugs.

Figure 7:
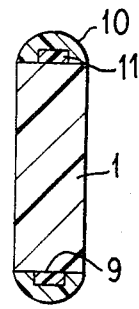
FIG. 7 is a cross sectional view showing the arrangement of an outer envelope consisting of a band or ring of tensile material with a coating of thermally activated adhesive.

For the purpose of supporting the plastic sealing compound, all of these exemplary embodiments of filling pieces can be provided with a band or a ring of tensile material on their outer circumference, as is indicated in the sectional view of FIG. 7. The plastic sealing compound of the filling piece 1 is surrounded by a ring 11 of tensile material, this, in the present example, also being additionally coated at the outside with thermally activatable adhesive 10. The ring 11 can also consist of shrinkable material so that an additional compression of the sealing material occurs due to the shrinking of the ring 11 during the shrink process. The thermally activatable adhesive 10 thereby produces the adhesion and seal to the surrounding shrink fitting. The ring or tape 11 is expendiently cut out arc-like in those areas in which contact with the cables can arise under given conditions.

Figure 8:
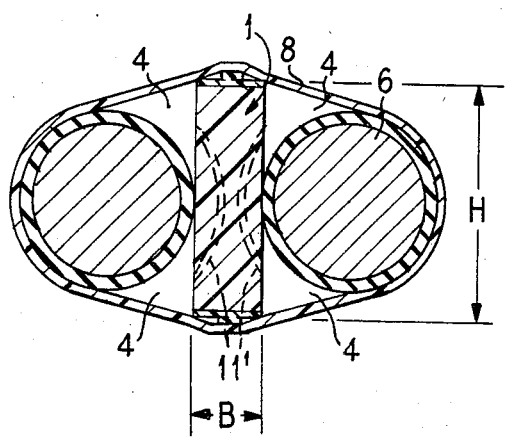
FIG. 8 is a sectional view showing an alternate embodiment of the filling piece and its configuration before the cable fitting sleeve has been heat shrunk.
Figure 8A:
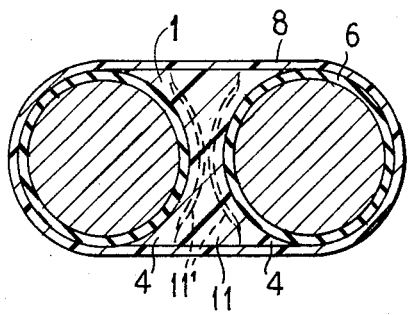
FIG. 8A is an end view showing an alternate embodiment of the filling piece and its configuration after the cable fitting sleeve has been heat shrunk.
Figure 9:
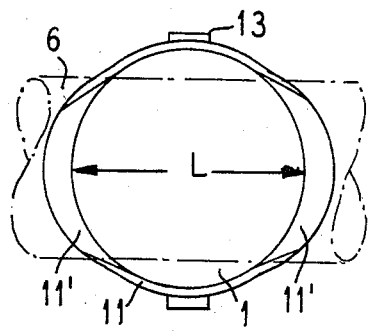
FIG. 9 is a side view of the filling piece of FIG. 8.
Figure 10:
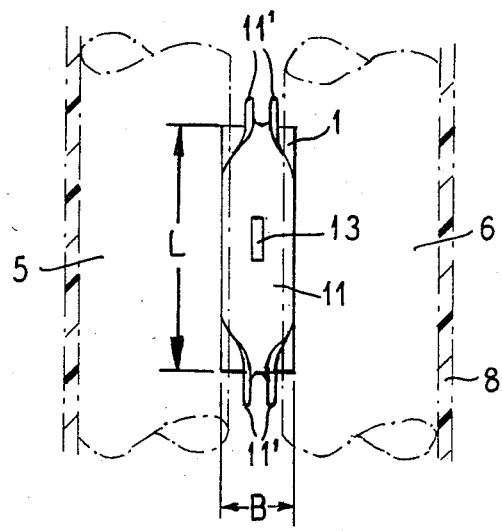
FIG. 10 is a side view of the filling piece of FIG. 9 rotated 90°.

The following FIGS. 8-10 illustrate a further exemplary embodiment of a filling piece 1 that is surrounded by a ring 11 that is drawn outward as projections 11' in the areas of possible contact with the introduced cables 5 and 6 and, thus, is narrower in these areas than in its remaining longitudinal extend. In an elevation view, FIGS. 8 and 8A show two introduced cables 5 and 6 that are pressed into the plastic sealing compound of the filling piece 1 lying therebetween. The sealing material of these regions as well as the regions extending beyond the diameters of the cables are again compressed into the gore areas 4 due to the shrinkage of the cable fitting 8. The filling piece 1 is thereby surrounded by a ring 11 that is retracted as projections 11, in the area between the two cables 5 and 6. FIG. 9 shows the same arrangement in a longitudinal view, whereby the cable 5 has not been shown for the sake of clarity.

It becomes clear that the filling piece 1 is circularly designed in its original shape and is inserted in longitudinal direction along the cables 5 and 6, whereby the swelling and subsiding shape is given by the circular form. The band 11 surrounding the sealing compound of the filling piece 1 again displays the retracted projections 11' that extends from both ends of the sealing area. This cable introduction is shown as a plan view in FIG. 10. It is clear that the filling piece 1 is introduced between the two cables 5 and 6 in longitudinal direction. At the beginning and at the end of the sealing area, the ring 11 is respectively contracted at its two edges as projection 11' and respectively forms the outwardly directed projection 11'. After shrinking, the two cables, pressed only slightly into the filling piece 1 here in the preliminary assembly, are pressed close to one another, whereby the plastic sealing compound is compressed along the cable contact surface.

As an advantageous supplement to the design of the filling pieces 1, outwardly directed stampings 13 (seen in FIGS. 9 and 10) can be additionally applied to the ring 11 consisting of shrinkable material, these then serving as indicators for sufficient delivery of heat. These stampings of the ring 11 in the inside of the cable fitting are likewise heated through the wall of the cable fitting during the shrink process and soften when the delivery of heat is adequate. They then lose their sharp-edged contour due to the compression of the shrink fitting and thus indicate that the delivery of heat is sufficient. The delivery of heat can be discontinued after this indication. A simple indication regarding the delivery of heat required for the activation of the thermally activated adhesive is obtained in this manner.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:
1. A cable fitting comprising:
a heat shrinkable cable fitting,
a plurality of cables which may be of varying diameters,
   said cables having parallel axes in the fitting,
a filling piece of plastic sealing material for sealing the gore areas between said cables,
   said filling piece having a longitudinal expanse and an approximately rectangular cross-sectional shape in a plane perpendicular to said longitudinal expanse,
   said longitudinal expanse adapted to lie parallel to said cable axes and including longitudinal surfaces, some of which are to be contacted by said cables,
   said rectangular cross-sectional shape being dimensioned such that one lateral expanse, as the height of said filling piece, is at least as great as a diameter of a smallest of said cables but is not more than four times as large as a diameter of a largest of said cables, and such that a second lateral expanse, as the width of said filling piece, is greater than half the diameter of the smallest cable but smaller than the diameter of the largest cable,
at least one of said lateral expanses being greater intermediate to the longitudinal ends of said piece than at the ends of said piece,
said longitudinal surfaces not contacted by said cables being surrounded by a tensile band consisting of heat-resistant material.
2. A cable fitting comprising:
a heat shrinkable cable fitting,
a plurality of cables which may be of varying diameters,
   said cables having parallel axes in the fitting,
a filling piece of plastic sealing material for sealing the gore areas between said cables,
   said filling piece having a longitudinal expanse and an approximately rectangular cross-sectional shape in a plane perpendicular to said longitudinal expanse,
   said longitudinal expanse adapted to lie parallel to said cable axes and including longitudinal surfaces, some of which are to be contacted by said cables,
   said rectangular cross-sectional shape being dimensioned such that one lateral expanse, as the height of said filling piece, is at least as great as a diameter of a smallest of said cables but is not more than four times as large as a diameter of a largest of said cables, and such that a second lateral expanse, as the width of said filling piece, is greater than half the diameter of the smallest cable but smaller than the diameter of the largest cable,
at least one of said lateral expanses being greater intermediate to the longitudinal ends of said piece than at the ends of said piece,
said longitudinal surfaces not contacted by said cables being surrounded by a tensile band consisting of heat-resistant material,
said band being coated with thermally activated adhesive at its outwardly directed side.
3. A cable fitting comprising:
a heat shrinkable cable fitting, a plurality of cables which may be of varying diameters,
said cables having parallel axes in the fitting,
a filling piece of plastic sealing material for sealing the gore areas between said cables,
  said filling piece having a longitudinal expanse and an approximately rectangular cross-sectional shape in a plane perpendicular to said longitudinal expanse,
  said longitudinal expanse adapted to lie parallel to said cable axes and including longitudinal surfaces, some of which are to be contacted by said cables,
  said rectangular cross-sectional shape being dimensioned such that one lateral expanse, as the height of said filling piece, is at least as great as a diameter of a smallest of said cables but is not more than four times as large as a diameter of a largest of said cables, and such that a second lateral expanse, as the width of said filling piece, is greater than half the diameter of the smallest cable but smaller than the diameter of the largest cable,
at least one of said lateral expanses being greater intermediate to the longitudinal ends of said piece than at the ends of said piece,
said longitudinal surfaces not contacted by said cables being surrounded by a tensile band consisting of heat-resistant material,
said band being recessed arc-like in areas adapted to lie between the cables.

4. A cable fitting comprising:
a heat shrinkable cable fitting,
a plurality of cables which may be of varying diameters,
said cables having parallel axes in the fitting,
a filling piece of plastic sealing material for sealing the gore areas between said cables,
  said filling piece having a longitudinal expanse and an approximately rectangular cross-sectional shape in a plane perpendicular to said longitudinal expanse,
  said longitudinal expanse adapted to lie parallel to said cable axes and including longitudinal surfaces, some of which are to be contacted by said cables,
  said rectangular cross-sectional shape being dimensioned such that one lateral expanse, as the height of said filling piece, is at least as great as a diameter of a smallest of said cables but is not more than four times as large as a diameter of a largest of said cables, and such that a second lateral expanse, as the width of said filling piece, is greater than half the diameter of the smallest cable but smaller than the diameter of the largest cable,
at least one of said lateral expanses being greater intermediate to the longitudinal ends of said piece than at the ends of said piece,
said longitudinal surfaces not contacted by said cables being surrounded by a tensile band consisting of heat-resistant material,
said band being bent out arc-like into projections having a reduced width, being bent out in those areas adapted to lie between the cables.

5. A cable fitting comprising:
a heat shrinkable cable fitting,
a plurality of cables which may be of varying diameters,
said cables having parallel axes in the fitting,
a filling piece of plastic sealing material for sealing the gore areas between said cables,
  said filling piece having a longitudinal expanse and an approximately rectangular cross-sectional shape in a plane perpendicular to said longitudinal expanse,
  said longitudinal expanse adapted to lie parallel to said cable axes and including longitudinal surfaces, some of which are to be contacted by said cables,
  said rectangular cross-sectional shape being dimensioned such that one lateral expanse, as the height of said filling piece, is at least as great as a diameter of a smallest of said cables but is not more than four times as large as a diameter of a largest of said cables, and such that a second lateral expanse, as the width of said filling piece, is greater than half the diameter of the smallest cable but smaller than the diameter of the largest cable,
at least one of said lateral expanses being greater intermediate to the longitudinal ends of said piece than at the ends of said piece,
said longitudinal surfaces not contacted by said cables being surrounded by a tensile band consisting of heat-resistant material,
outwardly directed stampings of the band consisting of heat shrinkable material are formed.

6. A cable fitting comprising:
a heat shrinkable cable fitting,
a plurality of cables which may be of varying diameters,
said cables having parallel axes in the fitting,
a filling piece of plastic sealing material for sealing the gore areas between said cables,
  said filling piece having a longitudinal expanse and an approximately rectangular cross-sectional shape in a plane perpendicular to said longitudinal expanse,
  said longitudinal expanse adapted to lie parallel to said cable axes and including longitudinal surfaces, some of which are to be contacted by said cables,
  said rectangular cross-sectional shape being dimensioned such that one lateral expanse, as the height of said filling piece, is at least as great as a diameter of a smallest of said cables but is not more than four times as large as a diameter of a largest of said cables, and such that a second lateral expanse, as the width of said filling piece, is greater than half the diameter of the smallest cable but smaller than the diameter of the largest cable,
at least one of said lateral expanses being greater intermediate to the longitudinal ends of said piece than at the ends of said piece,
said longitudinal surfaces not contacted by said cables being surrounded by a hand consisting of shrinkable material.

* * * * *